US007211605B2

(12) United States Patent
Coronado et al.

(10) Patent No.: US 7,211,605 B2
(45) Date of Patent: *May 1, 2007

(54) SUPER-HYDROPHOBIC FLUORINE CONTAINING AEROGELS

(75) Inventors: Paul R. Coronado, Livermore, CA (US); John F. Poco, Livermore, CA (US); Lawrence W. Hrubesh, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 10/794,847

(22) Filed: Mar. 4, 2004

(65) Prior Publication Data
US 2004/0171700 A1 Sep. 2, 2004

Related U.S. Application Data

(62) Division of application No. 09/957,853, filed on Sep. 21, 2001, now abandoned.

(60) Provisional application No. 60/292,195, filed on May 18, 2001.

(51) Int. Cl.
*C08J 3/02* (2006.01)
*C03C 3/00* (2006.01)
*B01J 13/00* (2006.01)

(52) U.S. Cl. .............. 516/100; 516/136; 210/661; 427/220; 427/249.2; 428/405; 501/12

(58) Field of Classification Search ............. 210/661; 516/136, 100; 427/220, 249.2; 428/405; 501/12
See application file for complete search history.

(56) References Cited

U.S. PATENT DOCUMENTS

| 2,870,109 | A | * | 1/1959 | Nickerson ............. 106/490 |
| 2,978,298 | A | * | 4/1961 | Wetzel et al. .......... 516/111 |
| 4,469,522 | A | * | 9/1984 | Matsumoto ............ 106/490 |
| 5,093,286 | A | * | 3/1992 | Nogami et al. ......... 501/12 |
| 5,824,739 | A | * | 10/1998 | Kondo et al. .......... 516/120 |
| 5,958,363 | A | * | 9/1999 | Coronado ............. 423/594.1 |
| 6,005,012 | A | * | 12/1999 | Hrubesh et al. ........ 521/53 |
| 6,013,440 | A | * | 1/2000 | Lipshutz et al. ........ 435/6 |
| 6,168,773 | B1 | * | 1/2001 | Sharp ................ 423/338 |
| 6,174,926 | B1 | * | 1/2001 | Menon et al. .......... 516/100 |
| 6,191,173 | B1 | * | 2/2001 | Schwertfeger et al. ... 516/100 |
| 6,239,243 | B1 | * | 5/2001 | Deng et al. ........... 106/490 |
| 6,344,240 | B1 | * | 2/2002 | Menon et al. .......... 516/100 |
| 6,521,290 | B1 | * | 2/2003 | Kudo et al. ........... 427/220 |
| 6,582,761 | B1 | * | 6/2003 | Nishimoto et al. ...... 428/405 |
| 2002/0173554 | A1 | * | 11/2002 | Baumann et al. ....... 516/98 |
| 2002/0185444 | A1 | * | 12/2002 | Coronado et al. ...... 210/693 |

FOREIGN PATENT DOCUMENTS

| JP | 2001-072408 A | * | 3/2001 |
| WO | WO 97/10177 | * | 3/1997 |
| WO | WO97/22652 | * | 6/1997 |

OTHER PUBLICATIONS

Matsushita Electric Works Ltd, JP 2001072408 A, machine translation from the Japan Patent Office, http://www6.ipdl.jpo.go.jp/Tokujitu/PAJdetail.ipdl?N0000=60&N0120=01&N2001=2&N3001=2001-072408, (Nov. 2005).*
JPO on EAST, Patent Abstract of Japan, JP 2001072408 A, (Matsushita Electric Works Ltd), abstract (2 pages), (Mar. 2001).*
www online @ Xerogel—Wikipedia, the free encyclopedia, http://en.wikipedia.org/wiki/Xerogel, p. 1 of 1, (Dec. 19, 2006).*
www online @ Webster's Dictionary : Full text "Xerogel" or "Aerogel", http://lionreference.chadwyck.com/searchFulltext.do?id=38931863&idType=offset&divLevel=2&queryId=../session/1166567970_19737&area=mwd&forward=refshelf&trail=refshelf, p. 2 of 2, (Dec. 19, 2006).*

* cited by examiner

Primary Examiner—Daniel S. Metzmaier
(74) Attorney, Agent, or Firm—John P. Wooldridge; John H. Lee

(57) ABSTRACT

An aerogel material with surfaces containing fluorine atoms which exhibits exceptional hydrophobicity, or the ability to repel liquid water. Hydrophobic aerogels are efficient absorbers of solvents from water. Solvents miscible with water are separated from it because the solvents are more volatile than water and they enter the porous aerogel as a vapor across the liquid water/solid interface. Solvents that are immisicble with water are separated from it by selectively wetting the aerogel. The hydrophobic property is achieved by formulating the aerogel using fluorine containing molecules either directly by addition in the sol-gel process, or by treating a standard dried aerogel using the vapor of fluorine containing molecules.

8 Claims, No Drawings

SUPER-HYDROPHOBIC FLUORINE CONTAINING AEROGELS

RELATED APPLICATION

This application is a Divisional of U.S. patent application Ser. No. 09/957,853 filed Sep. 21, 2001 by Paul R. Coronado et al. "Super-Hydrophobic Fluorine Containing Aerogels", now abandoned, published as USPUB 2003/0032681, which claims priority to U.S. Provisional Application Ser. No. 60/292,195 filed May 18, 2001.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the separation of organics from liquid water, particularly to the use of hydrophobic aerogels as the separation medium, and more particularly aerogel materials with surfaces containing fluorine atoms which results in exceptional hydrophobicity, or the ability to repel liquid water.

A common approach to remove organic solvent pollutants from water is by filtration using porous materials. A variety of porous materials are useful for filtration but generally highly porous materials have the highest specific surface area and the highest absorption capacity. For this reason and because it is a relatively inexpensive product, granulated activated carbon (GAC) is usually selected as a filter medium; it is the standard for comparison.

Sol-gel derived porous materials, commonly known as aerogel or xerogels, are being developed for special filtration applications because they are chemically stable, they have very high specific surface areas, and they can readily be made as membranes for filtration application. These materials shown promise for separating organics from aqueous solutions because organic molecules have an affinity to adsorb on certain surfaces.

Aerogels and xerogels, hereafter referred to as aerogels, tend to be very hygroscopic (have affinity for water) due to the very small pores and the high surface areas within. Unmodified aerogels are generally incompatible with liquids and they will typically be destroyed upon contact with any liquids, including water. It is now known in the art that surfaces of the aerogel material can be chemically modified to make them more compatible with contracting water. However, the degree of hydrophobic nature (ability to shed water) is typically not quantified for such treated aerogels and the hydrophobic property usually changes with time. An improvement in the art will be an aerogel that has a distinct, quantified hydrophobic, nature and which will retain the property indefinitely under normal use conditions. Such an aerogel is described and claimed in U.S. Pat. No. 6,709,600, filed Sept. 21, 2001, and entitled "Method for Removing Organic Liquids from Aqueous Solutions and Mixtures."

The present invention provides super-hydrophobic fluorine containing aerogel materials which exhibit exceptional hydrophobicity. These aerogel materials are compatible with various environments and enables many applications. The super-hydrophobic property of the aerogel material made in accordance with the present invention is achieved by formulating the aerogel using fluorine containing molecules either directly by addition in the sol-gel process, or by treating a standard dried aerogel material using the vapor of fluorine containing molecules.

SUMMARY OF THE INVENTION

It is an object of the present invention to provide a hydrophobic aerogel material.

A further object of the invention is to provide an aerogel material with surfaces containing fluorine atoms.

Another object of the invention is to provide an aerogel material which exhibits exceptional hydrophobicity.

Another object of the invention is to provide an aerogel materials that has a distinct, quantified hydrophobic nature and which retains that property indefinitely under normal use conditions.

Another object of the invention is to provide a hydrophobic aerogel, wherein the hydrophobic property is achieved by formulating the aerogel using fluorine containing molecules either directly by addition in the sol-gel process, or by treating a standard dried aerogel using the vapor of fluorine containing molecules.

Another object of the invention is to provide a highly transparent hydrophobic silica aerogel.

Another object of the invention is to produce hydrophobic aerogels which are synthesized using fluorine containing compounds which have at least one carbon-metal bond per molecule.

Other objects and advantages of the present invention will become apparent from the following description. This invention involves an aerogel material that has the property of repelling liquid water, it is hydrophobic. The hydrophobic property is achieved by formulating the aerogel using fluorine containing molecules either directly by addition in the sol-gel process, or by treating a standard dried aerogel using the vapor of fluorine containing molecules. The fluorine containing compounds utilized to produce hydrophobic aerogels have at least one carbon-metal bond per molecule. Such fluorine containing compounds include perfluoroalkyl-alkoxy silanes, and trifluoropropyl-trimethoxysilane (TFPT-MOS). While hydrophobic silica aerogels can be made from pure fluorine containing molecules, the optical properties of the aerogel are usually negatively affected. However, highly hydrophobic aerogels which are highly transparent can be achieved by adding less than 30% by weight of certain fluorine containing alkoxides to the silicon alkoxide during the gel synthesis. The super-hydrophobic fluorine containing aerogels of the present invention are of particular use in the removal of organics from aqueous solutions. Adsorption isotherms for hydrophobic silica aerogels, for several solvents (e.g. toluene, ethyl alcohol, trichloroethylene, chlorobenzene) in water mixture show the adsorption capacities exceed the capacity of the standard granular activated carbon (GAC), on a gram-per-gram basis. The improved performance of adsorption capacity by hydrophobic aerogel over the GAC ranged from factors of ~30 times for low molecular weight, highly soluble solvents to factors of 130 times for immiscible solvents.

DETAILED DESCRIPTION OF THE INVENTION

The present invention is directed to super-hydrophobic aerogels. The surfaces of the aerogel material contains fluorine atoms, and such material exhibits exceptional hydrophobicity, or the ability to repel liquid water. This property makes the aerogel material more compatible with various environments and enables many applications including water purification filters, oil clean up, thermal insulating windows. The aerogel materials can be fabricated with a distinct, quantified hydrophobic nature and which will retain that property indefinitely under a normal use conditions.

As pointed out above typical aerogels are easily wet by most liquids but they can be made or modified to repel water, and to some extent, other aqueous solutions. While there are several ways to make hydrophobic silica aerogels which are doped with fluorinated organic groups exhibit the highest degree of hydrophobicity. The contact angles for a variety of hydrophobic aerogels have been measured, including tri-methyl, tri-fluoro, and methoxy terminated siloxanes and determined that the 3,3,3-trifluorpropyl containing aerogels gave the highest contact angles. In verifying this invention silica aerogels doped with 30% by weight of the fluoropropyl compound were used, and which gave a contact angle $\geq 150°$. While hydrophobic silica aerogels can be made from the pure fluorine containing molecules, the optical properties of the aerogel are usually negatively affected. However, silica aerogels doped with not more than about 30% by weight of certain fluorine containing alkoxides added to the silicon alkoxide during the gel synthesis are highly transparent as well as highly hydrophobic. Thus, by this invention transparent silica angles having a contact angle of $\geq 150°$ can be fabricated. Thus, hydrophobic silica aerogels can be effectively used for cleaning certain organic solvents from wastewater, and provide adsorption capacity comparable with a granulated activated carbon (GAC).

The hydrophobic aerogels of the present invention can be produced by formulating the aerogel using fluorine containing molecules either directly by addition in the sol-gel process, or by treating a standard dried aerogel using the vapor of fluorine containing molecules. The term aerogel used herein includes the xerogel material formed by a different drying process and convential aerogel material, resulting in different pore sizes and surfaces areas, as shown in the art.

For example, hydrophoblic aerogels are synthesized using fluorine containing compounds, as pointed out above, such as perfluoroalkyl-alkoxy silanes, with trifluoropropyl-tri-methoxysilane (TFPTMOS) being preferred. A necessary requirement is that the fluorine containing compound has at least one carbon-metal bond per molecule.

EXAMPLE 1

A hydrophobic silica aerogel is synthesized directly from TFPTMOS by mixing 85 gms of TFPTMOS and 64 gms of methyl alcohol with a solution of 64 gms of alcohol and 72 gms of water and using 40 micrograms of a catalyst such as ammonium hydroxide. The mixture is stirred for 15 minutes and poured into molds. Gelation occurs within 60 minutes.

EXAMPLE 2

Silica aerogels with less concentration of the TFPTMOS are also very hydrophobic. Examples are mixtures with 10, 20, and 30% by weight of TFPTMOS in silica gels. The 10% synthesis is done by mixing 0.5 gms of TFPTMOS with 30 gms of tetramethoxysilane (TMOS) and 72 gms of alcohol, 17.5 gms of water and adding 12.5 milligrams of a catalyst such as ammonium hydroxide. Other catalysts such as $NH_4F$, $N_aOH$, and HCl could be used. The mixtures is stirred for 2 minutes and poured into molds. Gelation occurs in 120 minutes. The 30% synthesis is done by mixing 75 gms of TFPTMOS with 150 gms of TMOS and 360 gms of alcohol, 88.7 gms of water and addling 62.5 milligrams of a catalyst, such as ammonium hydroxide. The mixture is stirred for 2 minutes and poured into molds. Gelation occurs in 120 minutes.

EXAMPLE 3

Treating a standard dried aerogel with the vapor of fluorine containing molecules is carried out by heating the aerogel to at least 300° for 60 minutes to dehydrate it, then after cooling to room temperature, exposing it to a vapor or TFPTMOS for at least 120 minutes.

After the gels of Examples 1 and 2 above are formed they are dried either using an autoclave to extract the solvent fluid (alcohol) above its critical temperature and pressure (about 4 hours), or they are slowly dried by evaporation (1–4 weeks, depending on the size of the aerogel) at normal temperature and pressure.

As pointed out above, the hydrophobic nature of the aerogels is determined by measuring the angle made by a water droplet on a surface of the aerogel. The surface is hydrophobic if the droplet makes an angle with the surface, between 90° and 180°; the larger the contact angle, the larger the repelling force at the surface of the aerogel. All of the aerogels formulated as in Examples 1 and 2 above have contact angles greater than 135°, indicating a very high degree of hydrophobicity.

The following sets forth experimental verification of the present invention under the subheadings: experimental, results, discussion, and conclusion:

Experimental

The hydrophobic silica aerogels were made by sol-gel processing a fluoromethyl containing alkoxide, 3,3,3-trifluoropropyl-trimethoxysilane (TFPTMOS), with tetramethoxysilane (TMOS). The TFPTMOS and TMOS were purchased from United Chemical Technologies, Inc. Bristol, Pa. Other chemicals include, methyl alcohol (research grade) and ammonium hydroxide, purchased from Aldrich Chemicals Co. The 30% fluoro-propyl doped silica gels were synthesized by mixing TMOS, TFPTMOS, methanol, water and ammonium hydroxide in a molar ration of 1:0.33:11.25:5:0.002. The mixture is stirred for 10 minutes and poured into molds. Gelation occurs in 120 minutes. After the gels are formed they are dried under supercritical methanol in an autoclave at 300° C. and 12.2 MPa pressure.

The sillica aerogel is ground into powder for these experiments, by milling it to 325 mesh. The Brunauer, Emmitt, Teller (BET) surface areas of the aerogel powders were measured using a Micromeritics Model 2000.

To quantify the hydrophobic degree of the silica aerogel, the contact angle of a sessile drop of water on the surface of a monolithic aerogel is measured. The angle that is measured is defined by the surface and the tangent to the droplet from the point of contact of the droplet at the surface. For ease of measurement, a photograph of the droplet is taken; the contact angle is measured directly from the photographic image.

Four different solvents were used for this study; toluene, ethanol, chlorobenzene and trichloroethylene. All solvents were purchased from Aldrich as research grade. For the water miscible solvents, a stock solution is prepared by injecting the pure solvent into reagent grade water contained in a 250 mL bottle. This solution is thoroughly mixed by shaking the capped container. An amount is withdrawn for analysis by GC/MS. For the water immiscible solvents, the amount of solvent is weighed before adding it to the water.

Separate methods were used to measure the capacity of solvent adsorption for the aerogels, depending on the miscibility of the solute. For immiscible solutes, a column method was used (the column method is described in Groundwater Treatment Report Spring Quarter 1990, University of California, Environmental Hazard Management Program, p. 49–52). A measured weight of the powdered aerogel is contained between glass wool stops in a glass column. The water/solvent mixture is weighed before pouring into the column. The solution flows with gravity. The effluent and the aerogel powder are both weighed to determine the amount of solvent absorbed. For miscible solutes, ASTM procedures D 3860-89a and D 5919-96 were used. (See Annual Book of ASTM Standards, Vol. 15.01, for example.) For these experiments, the powdered aerogel is immersed in a quantity of the prepared stock solution, in a capped container, and shaken. After equilibration, the container is centrifuged to separate the powder from the liquid. The solution is measured analytically by GC/MS for the quantitative determination before and after exposure.

For purposes of comparing the adsorption capacity of the hydrophobic aerogel with GAC, the Freundlich adsorption model is used. See H. Freundlich, Colloid and Capillary Chemistry (Methuren, London, 1926) p.39. The Freundlich model is used over other isotherm models because it takes account of the heterogeneity of real surfaces for adsorption. It assumes that the frequency of sites available for adsorption decreases exponentially with increasing free energy. The procedure consists of determining the amount of solvent removed by the powdered absorber, by measuring the concentration before and after exposure.

The amount of the constituent adsorbed, X, is determined as follows:

$$X = C_0 V - C_f V \quad (1)$$

where:
- X=mass of the constituent adsorbed, mg,
- $C_0$=initial concentration, mg/L,
- $C_f$=final concentration, mg/L, and
- V=volume of the treated solution, L.

The mass of the constituent adsorbed per unit weight of the absorber, X/M, in mg/g, is calculated. The Freundlich constants K and 1/n are determined from the best-fit straight line on a log-log plot of the remaining concentration, $C_f$, in mg/L, vs. X/M, in mg/g. The constant, K, of the Freundlich isotherm equation is found from the log-log plot by finding the value of X/M for $C_f$=1. The slope of the straight line is equated to the constant, 1/n. The value of X/M, the milligrams of constituent adsorbed per gram of absorber, is determined for any concentration, C, by using the Freundlich equation:

$$X/M = KC^{1/n} \quad (2)$$

Results

The highest degree of hydrophobicity was determined for the 30% TFPTMOS/70% TMOS aerogels. The measured contact angle for this aerogel is 150°. The 30% doped silica aerogel was used for all of the adsorption studies.

A Freundlich isotherm for ethanol adsorbed from water was made. The Freundlich constants, K and 1/n, are determined from the slope and intercept of this plot. The constants are then used to calculate the adsorption capacity of the aerogel for any concentration of the ethanol. Similar plots are obtained for all of the solvents tested. The capacities of aerogel compared with GAC for a concentration of lg/L, are shown in Table 1, for each of the solvents tested.

The adsorption capacity of the hydrophobic aerogel exceeds that for the GAC for all of the solvents tested. The capacity of the aerogel for the chlorobenzene, an immiscible solvent, is more than 130 times greater than the GAC.

The measured values of the BET surface areas are compared with the vendor supplied values for GAC, in Table 2. The surface area for an undoped silica aerogel is also included for comparison. The surface areas for the hydrophobic silica aerogels are 30% to 60% higher than the undoped silica aerogel, but they are 30% to 40% less than for the GAC material. Coupled with the results in Table 1, this suggests that the hydrophobic nature of the aerogel is more important than the internal surface area for adsorption capacity.

TABLE 1

Comparison of Solvent Adsorption Capacities for Hydrophobic Silica Aerogel and Granulated Activated Carbon

| | Freundlich Constants | | | | Adsorption Capacity(mg/g)[a] | |
|---|---|---|---|---|---|---|
| | Silica Aerogel | | GAC[b] | | | |
| Solvent Compound | K | 1/n | K | 1/n | Silica Aerogel | GAC[b] |
| Toluene | 833 | 0.51 | 26.1 | 0.44 | 833 ± 122 | 26 |
| Ethanol | 458 | 0.46 | 11.0 | 0.69 | 458 ± 62 | 11 |
| Chlorobenzene | 11890 | 0.25 | 91.0 | 0.99 | 11890 ± 1683 | 91 |
| Trichloroethylene | 1935 | 1.92 | 28.0 | 0.62 | 1935 ± 272 | 28 |

[a]For solvent concentration of lg/L.
[b]The data for GAC is taken from R.A. Dobbs et al, U.S. EPA Report 600.880-023, Cincinnati (1980).

TABLE 2

Apparent Densities and BET Surface Areas for Several Granulated Porous Materials

| Material | Apparent Density (g/cc) | BET Surface Area (m²/g) |
|---|---|---|
| Filtrasorb 400 (20 × 30 mesh) GAC[a] | 0.47[b] | 1075[b] |
| Filtrasorb 400 (40 × 60 mesh) GAC[a] | 0.21[b] | 1155[b] |
| SiO₂ aerogel (typical TMOS) | 0.24 ± 0.02 | 493 ± 39 |
| SiO₂ aerogel (10% TFPTMOS) | 0.21 ± 0.02 | 660 ± 53 |
| SiO₂ aerogel (30% TFPTMOS) | 0.20 ± 0.02 | 788 ± 62 |

[a]Calgon Carbon Corporation, P.B. Box 717, Pittsburgh, PA 15009.
[b]Data from M. Lee et al, University of Illinois, Water Resources Center, UI LU- WRC-80-D153, Research Report 153 (November 1980).

Discussion

This work provides data which suggests that hydrophobic silica aerogels may be an efficient alternative to GAC for removing organic liquids from aqueous solutions and mixtures. The data substantiates the hypothesis that the water shedding property of the aerogel enables a more efficient separation of the organic constituent from liquid water. The separation probably occurs by preferential transport of the solvent vapors across the liquid-solid boundary at the surface of the hydrophobic aerogel. Those vapors can condense inside the porous aerogel. Also, organic solvents that are immiscible with water, preferentially wet the surfaces of the hydrophobic material and are drawn into the porous material by capillary action. Separation capacities of porous materials for this method greatly exceed those for non-hydrophobic porous materials because the pores do not preferentially fill with water before separations can occur.

Hydrophobic silica aerogel has higher capacity than GAC even though the surface area of GAC is 36% higher than the highest surface area sites. This is because water does not wick into the hydrophobic aerogel to compete with the more volatile solvent for available surface sites. So the efficiency of solvent adsorption is higher in the aerogel.

The capacity of the aerogel for chlorobenzene exceeds the weight expected if the solvent completely fills the available volume of the aerogel. Possibly, the immiscible solvent wicks into the aerogel causing it to swell, so granules can hold a larger volume of the solvent fluid than the original volume of the aerogel. Also, it is possible that the same solvent adheres to the aerogel granules, rather than penetrating, causing the granules to agglomerate into a mass that excludes water.

There are significant advantages of aerogels over GAC for solvent absorption from water: better performance, more efficient, less material needed, monodisperse granules are possible directly (no grinding or sizing needed), high surface areas without activation, possible continuous processing using aerogel as a membrane. A major disadvantage for this application is the high cost of hydrophobic aerogels.

CONCLUSIONS

Our measurement show that the adsorption capacity of the hydrophobic silica aerogels exceed the capacity of comparable granular activated carbon (GAC), on a gram-per-gram basis, for all the solvents tested. The improved performance of adsorption capacity by the aerogel over the GAC ranged from factors of ~30 times for low molecular weight, highly soluble solvents, to factors of 130 times for immiscible solvents. These substantial improvement factors significantly offset the cost factors which would otherwise favor the use of GAC for large-scale volatile organic compound (VOC) trapping and solvent clean-up applications.

It has thus been shown that the present invention provides an aerogel material with surface containing fluorine atoms which exhibits exceptional hydrophobicity. The hydrophobic property is achieved by two approaches: 1) formulating the aerogel using fluorine containing molecules directly by addition in the sol-gel process, or 2) treating a standard dried aerogel using the vapor of fluorine containing molecules. By experimental verification, it has been determined that the 3,3,3-trifluorprophyl containing aerogels gave the highest contact angles. Silica aerogels doped with 30% by weight of the fluoro-propyl compound gave a contact angle of $\geq 150°$ and were highly transparent. A necessary requirement is that the fluorine containing compound has at least one carbon-metal per molecule. Thus, this invention provides a significant advance in the field of aerogels as filters, etc., since the aerogel of this invention has a distinct quantified hydrophobic nature and which would retain that property indefinitely under normal use conditions.

While various embodiments, materials, parameters, etc. have been described to exemplify and teach the principles of the invention, such are not intended to be limiting. Modifications and changes may become apparent to those skilled in the art, and it is intended the invention be limited only by the scope of the appended claims.

What is claimed:

1. A method comprising:
   providing a hydrophobic aerogel material having surfaces containing fluorine atoms,
   wherein said material is selected from the group consisting of (i) a silica aerogel comprising less than 30% by weight of a fluorine containing compound and (ii) an aerogel, other than a silica aerogel; and
   comprising a fluorine containing compound having at least one carbon-metal bond per molecule,
   wherein said material has been prepared by a preparation method selected from the group consisting of (i) adding fluorine containing molecules into a sol-gel process to produce said material, and (ii) exposing an aerogel to a vapor comprising fluorine molecules; and
   contacting said hydrophobic aerogel to an aqueous solution containing organic compounds.

2. The method of claim 1, further comprising preparing said hydrophobic aerogel by adding fluorine containing molecules into a sol-gel process.

3. The method of claim 1, further comprising preparing said hydrophobic aerogel by exposing an aerogel to a vapor comprising fluorine molecules.

4. The method recited in claim 1, wherein the surface contact angle between said aqueous solution and said aerogel surface is in the range of 90° to 180°.

5. The method recited in claim 1, wherein said hydrophobic aerogel is transparent.

6. The method recited in claim 1, further comprising:
   removing said organic compounds from said aqueous solution.

7. The method recited in claim 6, wherein the surface contact angle between said aqueous solution and said aerogel surface is in the range of 90° to 180°.

8. The method recited in claim 6, wherein said hydrophobic aerogel is transparent.

* * * * *